June 20, 1967

J. W. JACOBS 3,326,787

METHOD OF MANUFACTURING POLYURETHANE FOAM
USING A GAS TO CREATE SONIC ENERGY

Filed Sept. 5, 1963

INVENTOR.
James W. Jacobs
BY
His Attorney

United States Patent Office 3,326,787
Patented June 20, 1967

3,326,787
METHOD OF MANUFACTURING POLYURETHANE FOAM USING A GAS TO CREATE SONIC ENERGY
James W. Jacobs, Dayton, Ohio, assignor to General Motors Corporation, Detroit, Mich., a corporation of Delaware
Filed Sept. 5, 1963, Ser. No. 306,783
2 Claims. (Cl. 204—159.11)

ABSTRACT OF THE DISCLOSURE

In the preferred form, the reacting foam forming chemicals such as isocyanate and activator materials are mixed and then passed through a resonating chamber. The resonating chamber is provided with a resonator of the whistle type to which is fed from a supply tank a gas or a volatile liquid such as trichlorofluoromethane to generate wave energy at sonic, supersonic or ultrasonic frequencies. This gas or liquid is mixed with the reacting chemicals in the high density field of wave energy provided by the resonator to form the foam before it is delivered to the space to be filled with foam.

---

Figure 1:
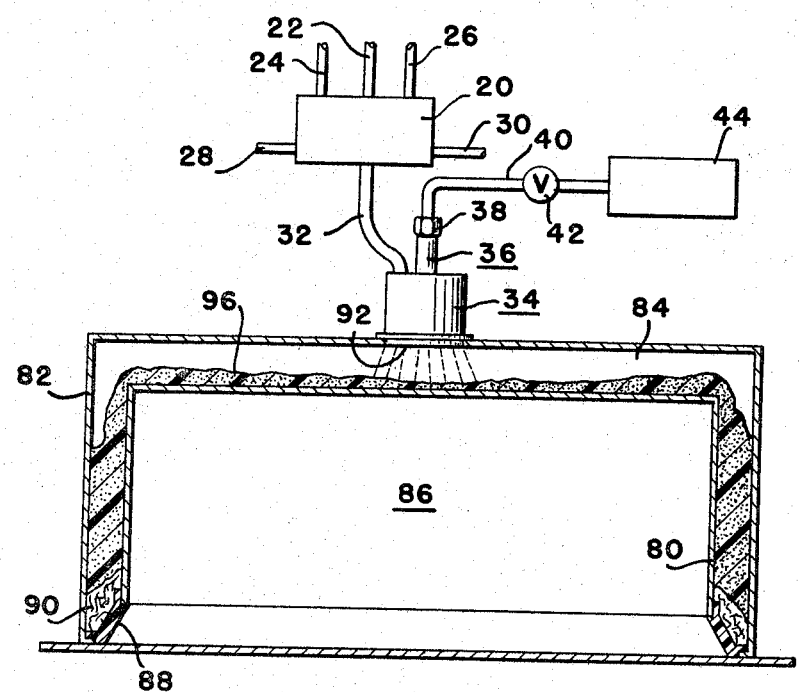

This invention relates to a method of manufacture and more particularly to subjecting materials capable of reacting and/or polymerizing to wave energy as they are being delivered.

The control of the chemical reaction and/or polymerization is important in obtaining a uniform product having desired characteristics and properties. This is especially true regarding foams and particularly polyurethanes and polyurethane foams. In these reactions it is necessary first to react the isocyanate with an activator mixture to form a monomer which is then polymerized. To provide a satisfactory foam, the gas must be introduced at the most desirable stage of polymerization in which the material is sufficiently strong to hold the gas in a multitude of tiny cells. If the gas is introduced too early before the cell walls acquire sufficient strength there is a tendency for the gas to burst the cells and escape. If the gas is introduced too late there is a tendency to form large cells which are irregular in size. Such forms have a higher density and lower insulating value than is desired.

It is an object of this invention to provide a method of and apparatus for treating and controlling the reaction and/or polymerization of the chemicals with wave energy as they are delivered to present them in the most desirable condition.

It is another object of this invention to provide an improved method of and apparatus for treating and controlling the reaction and/or polymerization of chemicals with wave energy in the sonic and/or supersonic frequency.

It is another object of this invention to provide an improved method of and apparatus for treating and controlling the reaction and/or polymerization of chemicals by passing a gas through a resonator and mixing the gas with the reacting chemicals in the field of the high intensity wave energy of the resonator so that the reaction and the polymerization are brought to the proper state for the mixing with the gas.

Generically, I mix the reacting chemicals and as they are being delivered from the mixer, I subject them to wave energy to accelerate the reaction and/or polymerization. More specifically, I pass the reacting foam forming chemicals such as isocyanates and activator materials, through a resonator or wave generator which generates wave energy in the sonic or supersonic frequencies. Further, I pass a gas such as trichloromonofluoromethane under pressure through the resonator to generate the wave energy and after first using this gas to generate the wave energy, I mix the gas with the reacting chemicals in the high intensity field of the wave energy to form a foam before it is delievered to the space to be filled.

Further objects and advantages of the present invention will be apparent from the following description, reference being had to the accompanying drawings wherein a preferred embodiment of the present invention is clearly shown.

Figure 2:
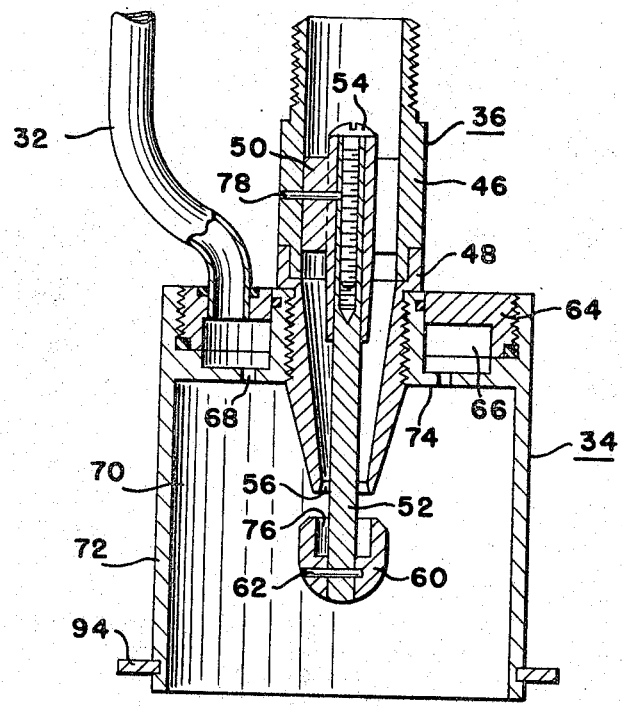

In the drawings:

FIGURE 1 is a diagrammatic illustration of an apparatus for carrying out my improved method in which the treated foam material is delivered to the insulation space of a refrigerator cabinet as shown in vertical section; and FIGURE 2 is a vertical sectional view through the resonator as shown in FIGURE 1.

Referring now to FIGURE 1 there is shown diagrammatically a mixer 20 including a drive shaft 22 for operating the mixer blade or other mixing device. The mixing apparatus 20 is arranged to have a component A delivered to it from the conduit 24 and a component B delivered to it through a conduit 26. Simultaneously operating valves control the delivery of the components A and B from the conduits 24 and 26 into the mixing chamber of the mixer 20. When the delivery is shut off the components A and B are returned and continuously recirculated through the return conduits 28 and 30 in separate recirculating systems which keeps the components A and B separately circulating at the proper temperature and conditions. The mixed components A and B which are mixed in mixer 20 are delivered through the conduit 32 into the resonator or gas operated wave generator 34.

The resonator 34 includes a plane wave nozzle 36 connected by the pipe 38, a tube 40, a valve 42 to a pressure chamber 44 containing a gas or volatile liquid such as trichloromonofluoromethane. The pressure chamber 44 therefore provides a gas supply under pressure sufficient to operate the nozzle 36 and particularly to generate wave energy at sonic or ultrasonic frequencies in its flow therethrough. The nozzle 36 includes two mating pieces 46 and 48 which are force fitted together to form a unitary member. Force fitted within the bore of the piece 46 is a spider 50. The central bore of the spider 50 receives the supporting stem 52 which may be moved actually by the adjusting screw 54. The member 48 is provided with a 15° conical bore forming a restricted throat 56 which again tapers outwardly in a downward direction at about a 15° angle to provide the nozzle. The restricted throat 56 is designed to provide an increase of air velocity to about Mach 1.0. The subsequent increase in diameter to form the expanded end of the nozzle results in achieving of a velocity of about Mach 1.5. Spaced below the restricted throat 56 is the resonator cup 60 which is pinned by the pin 62 to the bottom of the supporting stem 52. Preferably the distance from the lower face 74 of the annular housing 64 to the midpoint between the end of the throat 56 and the cup 60 is one wave length. The screw 54 is adjusted to provide the frequency desired. For example, an operating range of 17,500 to 18,500 cycles per second may be beneficially employed. More specifically, 18,000 cycles per second may be used.

Surrounding the piece 48 is an annular housing 64 containing an annular chamber 66 into which feeds the mixture supply pipe 32. The annular housing 64 provides a suitable number of, such as eight, orifices 68 leading from the annular chamber 66 into the resonator chamber 70 surrounding the resonator cup 60. The resonator chamber 70 is enclosed by a cylindrical wall 72. The orifices 68 are placed the optimum distance from the resonator cup 60. The lower face 74 of the annular housing 64 serves to beam the sonic or supersonic energy field downwardly and outwardly within the resonator chamber 70 and against the cylindrical wall 72 so that the energy is not randomly dissipated. The mixture of components from the conduit 32 passes through the annular chamber 66 and the orifices 68 into the sonic or supersonic energy field which is generated in the resonator cavity 76. The orifices 68 are directed in such a way as to prevent the components discharged therefrom from contaminating the resonator. After the screw 54 is adjusted to provide the desired spray pattern a passage may be drilled and a locking pin 78 inserted to prevent further adjustment.

In the resonating chamber 70 the mixed components react to form the monomers which are polymerized in the high sonic energy field within the resonating chamber 70. The gas which is discharged from the throat 56 into the resonator cavity 76 is reversed in direction and penetrates the reacted mixture at the proper stage of its polymerization. The reaction is speeded up and completed by taking place in the high sonic or supersonic wave energy field. This also facilitates the penetration of the mixture by the gas and the formation of the minute cells in the reacted mixture containing the gas flowing as a uniform foamed mixture through the resonator chamber 70.

After being reacted, partially polymerized and penetrated by the gas in the high energy field and the resonator chamber 70 the foam is discharged into the space to be filled. As one example of such a space there is illustrated in FIGURE 1 a refrigerator cabinet shell having a metal inner liner 80 enclosing a storage compartment 86 and itself surrounded by an outer metal shell 82 providing between them an insulation space 84. A breaker strip 88 of a suitable plastic connects the throat of the inner liner 80 and the outer shell 82. To prevent the foam material from adhering to the breaker strip 88 and to permit the removal of the breaker strip 88 there is provided over the breaker strip 88 a layer of glass or rock 90 in which may be laid suitable refrigerant conduits and electrical conductors. The rear wall of the outer shell 82 is provided with a centrally located filler opening into which extends the lower lip of the cylindrical casing 72. The casing 72 is provided with a flange 94 which rests on top of the edges of the filler opening in the rear wall during the filling of the insulation space 90. The foam material 96 gradually fills the insulation space 84, first filling the portions nearest the breaker strip 88 and thereafter filling the space in the adjacent portions of the vertical walls and finally filling the portion nearest the rear wall. The sonic and supersonic wave energy penetrates the insulation space 84 and assists in the distribution of the foam material 96 so that all the space is filled and the foam material is distributed evenly at a substantially uniform density so that it has excellent insulating property as well as considerable structural strength serving to bond the inner liner 8 and the outer shell 82 together to form a strong structure.

As one specific example of the A component 100 parts by weight of a prepolymer made from 79 parts of a polyisocyanate mixture and 21 parts by weight of a polyether A as defined hereinafter. The polyisocyanate mixture comprises 80 parts of 2,4 toluenediisocyanate and 20 parts of 2,6 toluenediisocyanate. For the corresponding B component a mixture of 124 parts of the same polyether A is mixed with .208 part by weight of trimethylbutanediamine and .104 part of organosilicone surfactant. The components A and B are mixed in the mixer 20 in the proportion of 100 parts of the component A to 124.312 parts of the component B. The mixed components are supplied through the conduit 32 and the chamber 66 and the orifices 68 to the resonator chamber 70. The trichloromonofluoromethane gas introduced through the nozzle 36 into the chamber 70 in the proportion of 3.688 parts by weight to the 224.312 parts by weight of the combined mixture of components A and B.

The polyether A, expressed in mols unless otherwise noted, is as follows:

Sucrose—1
Propylene Oxide—11
Ethylene oxide—4
OH No.—445 to 470
Water maximum (by weight)—.15%
Viscosity c.p.s. at 25° centigrade—22,000 to 32,000
pH—3.5 to 5

As a second specific example, the A component is made up of 75 parts by weight of a polyisocyanate mixture and 25 parts by weight of a polyester A as defined hereinafter. The polyisocyanate mixture is made up of 80 parts of 2,4 toluenediisocyanate and 20 parts of 2,6 toluenediisocyanate. The B component is made up of 60 parts of the same polyester A to 11.4 parts by weight of an activator. This activator is made up of 9.4 parts of anhydrous ethylene glycol, 1 part of dimethylethanolamine and 1 part of organosilicone surfactant. The A and B components are mixed in mixer 20 and forwarded through the supply conduit 32 to the chamber 66 and the orifices 68 in the proportion of 83.3 parts of the A component to 71.4 parts of the B component. The trichloromonofluoromethane is supplied through the chamber 20 in the proportion of 16.7 parts to 171.4 parts of the mixed components A and B. In the above all parts are by weight. The polyesther A is made up of:

Phthalic anhydride, 2 mols
Adipic acid, 10 mols
TMP (2,2 dihydroxymethyl, 1 butanol), 18 mols
Lead (as metallic lead by weight), .030%
OH No. 440
Acid number (maximum), 1.5
Water maximum (by weight), .15%
Viscosity (c.p.s.) at 165° centigrade, 2900

The quantities of reactants may vary in accordance with their acid number and/or hydroxyl number wherein stoichiometric quantities may be used to produce satisfactory polyurethane materials. The chemical formulations of these materials form no part of this invention which is specifically directed to the method of and apparatus for activating the ingredients to produce a controlled reaction and/or controlled polymerization through the use of wave energy. The frequency of the sonic or supersonic vibrations may be varied over a wide range such as from 250 cycles per second to 1,000,000 cycles per second.

While the embodiment of the present invention as hereinbefore disclosed, constitutes a preferred form, it is to be understood that other forms might be adopted.

What is claimed is as follows:

1. In a method of making improved foamed polyurethanes from polyurethane forming ingredients including as basic reactants a polyisocyanate and an activator and a surfactant and a gas and a material selected from the group consisting of polyether and polyester which will react with said polyisocyanate to form a polyurethane, the steps of passing the gas through a resonator to create high intensity wave energy and intermixing said gas and the reaction mixture in the field of the high intensity wave energy of the resonator to form foamed polyurethane.

2. In a method of making improved foamed polyurethanes from polyurethane forming ingredients including as basic reactants a polyisocyanate and an activator and a surfactant and a gas and a material selected from the group consisting of polyether and polyester which will react with said polyisocyanate to form a polyurethane, the steps of energizing a resonator by the passage of the gas from a source of pressure into a resonant chamber to create a field of high intensity wave energy in the chamber and during the passage of said gas introducing a reaction mixture of the polyisocyanate and an activator and a surfactant and said reacting material into said resonant chamber to form foamed polyurethane containing the gas in the cells thereof.

References Cited

UNITED STATES PATENTS

| | | | |
|---|---|---|---|
| 3,184,400 | 5/1965 | Magnus | 204—193 |
| 3,196,975 | 7/1966 | Voelker | 181—33 |
| 3,265,780 | 8/1966 | Long | 264—26 |

SAMUEL H. BLECH, *Primary Examiner.*

R. B. TURER, *Assistant Examiner.*